United States Patent

Garrett

[11] Patent Number: 5,156,575
[45] Date of Patent: Oct. 20, 1992

[54] NONSYNCHRONOUS AUTOMATIC OVERDRIVE TRANSMISSION

[75] Inventor: Roy J. Garrett, Redford Township, Wayne County, Mich.

[73] Assignee: Ford Motor Company, Dearborn, Mich.

[21] Appl. No.: 856,319

[22] Filed: Mar. 23, 1992

[51] Int. Cl.⁵ .............................................. F16H 57/10
[52] U.S. Cl. ...................................... 475/59; 475/284; 475/297; 475/324; 192/48.92; 192/48.4
[58] Field of Search ................. 475/59, 284, 285, 289, 475/297, 312, 324, 325; 192/48.4, 48.8, 48.92

[56] References Cited

U.S. PATENT DOCUMENTS

| | | | |
|---|---|---|---|
| 2,701,480 | 2/1955 | Seybold | 475/68 |
| 3,106,107 | 10/1963 | Hardy | 475/281 |
| 3,209,618 | 10/1965 | Schwab | 475/56 |
| 3,411,382 | 11/1968 | Mori | 475/33 |
| 3,482,469 | 12/1969 | Mori | 475/54 |
| 3,489,037 | 1/1970 | Mori et al. | 475/66 |
| 3,701,623 | 10/1972 | Mori et al. | 475/66 |
| 4,056,990 | 11/1977 | Hatano | 475/59 |
| 4,226,123 | 10/1980 | Croswhite | 475/56 |
| 4,233,861 | 11/1980 | Gaus et al. | 475/56 |
| 4,361,059 | 11/1982 | Kronogard | 475/276 |
| 4,417,484 | 11/1983 | Gaus et al. | 475/54 |
| 4,602,522 | 7/1986 | Dorpmund | 475/56 |
| 4,747,323 | 5/1988 | Kiuchi et al. | 475/59 |
| 4,787,258 | 11/1988 | Yamamoto et al. | 74/866 |
| 4,802,385 | 2/1989 | Hiraiwa | 475/54 |
| 4,811,631 | 3/1989 | Honig et al. | 475/56 |
| 4,884,472 | 12/1989 | Miura et al. | 475/148 |
| 4,934,216 | 6/1990 | Sandel et al. | 475/59 |
| 4,984,484 | 1/1991 | Fujiwara et al. | 74/866 |
| 5,013,287 | 5/1991 | Hayakawa et al. | 475/61 |
| 5,073,156 | 12/1991 | Garrett et al. | 475/56 |

FOREIGN PATENT DOCUMENTS 538959 4/1957 Canada .
2813223 9/1979 Fed. Rep. of Germany .

Primary Examiner—Leslie A. Braun
Assistant Examiner—William O. Trousdell
Attorney, Agent, or Firm—Roger L. May; Frank G. McKenzie

[57] ABSTRACT

A hydrokinetic planetary transmission mechanism having compound planetary gear elements that define multiple underdrive ratios, a direct drive ratio and an overdrive ratio as torque is delivered from the turbine of the hydrokinetic unit to a driven member wherein a friction clutch is used to establish a direct drive ratio as well as an overdrive ratio, separate overrunning couplings being used in cooperation with a friction clutch to establish torque delivery from a driven shaft to one element of the compound planetary gearing and a separate overrunning coupling being used in cooperation with a common clutch to establish a torque flow path between the driven shaft and another element of the compound planetary gearing during overdrive operation whereby ratio changes between the direct drive and the overdrive ratio on both upshifts and downshifts are smooth and fully nonsynchronous.

6 Claims, 2 Drawing Sheets

NONSYNCHRONOUS AUTOMATIC OVERDRIVE TRANSMISSION

TECHNICAL FIELD

This invention relates to automatic power transmission mechanisms for use in an automotive vehicle powertrain for transferring torque from a vehicle engine to vehicle traction wheels through a plurality of torque flow paths with varying ratios including an overdrive ratio.

BACKGROUND ART

My invention comprises improvements in a planetary gear transmission of the kind shown in my U.S. Pat. No. 5,073,156. That patent discloses a hydrokinetic torque converter and a compound planetary gear unit arranged in a transmission system for an automotive vehicle. The planetary gear unit is a so-called Ravagineaux-type planetary gear unit similar to the one that is described in U.S. Pat. No. 4,934,216. Both U.S. Pat. Nos. 5,073,156 and 4,934,216 are assigned to the assignee of this invention.

In both of the transmissions described in the prior art references described above, the planetary gear unit includes two torque input sun gears and a compound carrier assembly that includes long planet pinions meshing with short planet pinions. The long planet pinions engage a ring gear which in turn is connected to a driven shaft. The long planet pinions also engage the reverse drive sun gear with a larger pitch diameter. The short planet pinions engage the forward drive sun gear with the smaller pitch diameter and the long planet pinions.

In the transmission of the '156 patent, torque is distributed through a forward clutch to the smaller of the two sun gears during each of three forward driving ratios. A fourth overdrive ratio is achieved by anchoring the larger diameter sun gear and by clutching the compound carrier assembly to the torque input shaft. This overdrives the ring gear as the sun gear acts as a reaction point.

The clutch that is used during operation in the overdrive ratio is also the clutch that is used to establish direct drive operation in the third ratio. When that clutch is applied together with a companion clutch, which serves as a torque input friction element for the smaller of the two sun gears, all of the elements of the gear unit are locked together for rotation in unison.

On a ratio change from the third ratio to the fourth ratio, an overrunning clutch in series relationship with respect to the direct drive clutch free-wheels, thus effecting a nonsynchronous 3-4 upshift. Conversely, a nonsynchronous 4-3 downshift is achieved as the reaction member for the larger of the two sun gears is released.

The direct drive clutch disclosed in the '156 patent comprises a series of friction discs, a subset of the series of friction discs being connected drivably to the compound carrier and a companion subset being connected to the driving shaft through the forward clutch in series relationship with an overrunning coupling. Thus, on a 3-4 upshift, the overrunning coupling will free-wheel, thus establishing a nonsynchronous ratio change. At the time of that upshift, however, the carrier of necessity is rotating at an angular velocity that differs from the angular velocity of the forward clutch. Thus, the calibration of the direct clutch becomes complex because the dynamic considerations that are appropriate for one subset of friction discs is different than the dynamic considerations involved in the application of the friction discs of the other subset due to their differential rotary velocity. Also, a large number of friction discs is required in the arrangement of the kind shown in the '156 patent because the torque that is necessary to drive the compound carrier is delivered through only the discs of one subset of discs. Further, the torque associated with the smaller of the two sun gears is delivered to that sun gear only through the other subset of friction discs. Because of this arrangement, a large number of friction discs is required for any given torque capacity for the transmission.

The improvements of my invention make it possible to eliminate the differential angular velocity of the discs upon application of the direct drive clutch. This results in an improvement in shift quality on 3-4 upshifts and on 4-3 downshifts because differences in inertia torques are minimized. It also makes it possible to reduce the number of discs for any given torque capacity of the transmission. This in turn results in an economy of space and makes it more feasible to package the torque transfer elements of the gearing in a compact vehicle transmission installation.

BRIEF DESCRIPTION OF THE DRAWINGS

FIG. 3 is a cross-sectional view of one embodiment of my invention, corresponding to the schematic diagram of FIG. 1.

PARTICULAR DESCRIPTION OF THE INVENTION

Figure 1:
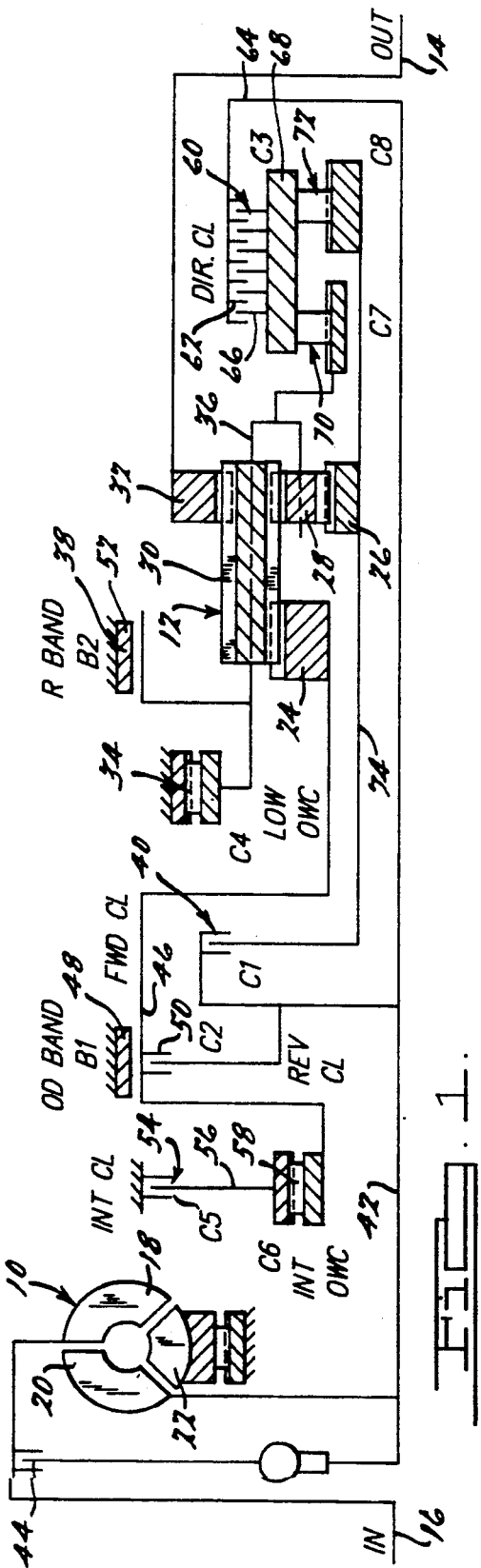
FIG. 1 is a schematic view of a planetary gear system that embodies the improvements of my invention.

In FIG. 1, reference numeral 10 designates a hydrokinetic torque converter, reference numeral 12 generally designates a compound planetary gear unit, and numeral 14 designates a torque output shaft which is adapted to be connected to the vehicle traction wheels through a geared differential and axle assembly. An engine crankshaft, generally designated by numeral 16, is connected drivably to the impeller 18 of the converter 10. A bladed turbine 20 of the converter 10 and a stator 22 of the converter 10 are arranged in toroidal fluid flow relationship with respect to the impeller 18 in the usual fashion.

The compound planetary gear unit includes a large sun gear 24 and a small pitch diameter sun gear 26. Sun gear 26 meshes with a set of short planet pinions 28 and sun gear 24 meshes with a set of long planet pinions 30. Pinions 28 also mesh with the pinions 30 and the pinions 30 also mesh with ring gear 32. Torque output shaft 14 is connected directly to the ring gear 32.

The compound carrier journals long planet pinions 30 and short planet pinions 28. It is braked during low speed ratio forward drive operation by an overrunning coupling 34. During reverse drive operation, the compound carrier, which is identified by numeral 36, is anchored by a reverse brake band 38.

A forward drive clutch 40 provides a driving connection between a small diameter sun gear 26 and a turbine shaft 42. Clutch 40 is engaged during operation in the first, second and third forward drive ratios, but is is not engaged during operation in the overdrive ratio. Turbine shaft 42 is connected to the turbine 20 and it is connected also to a direct drive lockup clutch 44 which is adapted, when engaged, to establish a direct driving connection between the crankshaft 16 and the turbine shaft 42.

During overdrive operation, sun gear 24 is anchored thereby providing a torque reaction point for the planetary gearing 12. Sun gear 24 is connected to a brake drum 46. Overdrive brake band 48 surrounds brake drum 46 and anchors it when an overdrive brake band servo is actuated.

During reverse drive operation, reverse clutch 50 is applied thereby establishing a driving connection between the turbine shaft 42 and sun gear 24. Reverse brake band 38 anchors carrier 36 during reverse drive operation thereby providing a torque reaction as reverse drive torque is delivered to the sun gear 24. This drives the ring gear 32 in a reverse direction.

During low speed ratio operation, the carrier 36 acts as a reaction point as mentioned above. To effect a ratio change from this first ratio to the second ratio, reaction points are changed. To accomplish this, the sun gear 24 is anchored by engaging intermediate brake 54. This brake comprises a friction disc 56 arranged in series relationship with respect to an overrunning coupling 58, the latter establishing a one-way driving connection between the brake drum 46 and the disc 56. The presence of the overrunning coupling 58 in series relationship with respect to the disc 56 permits a nonsynchronous 2-3 upshift. The 2-3 upshift is provided by engaging simultaneously clutch 40 with a selectively engagable direct clutch shown generally at 60.

The direct clutch 60 is located between the compound planetary gearing 12 and the output shaft 14. The direct clutch includes a plurality of friction discs 62 carried by clutch member 64 and a plurality of clutch discs 66 carried by a compound outer race 68 for overrunning couplings 70 and 72.

As will be explained with reference to FIG. 3, the friction discs 62 and 66 are adapted to be applied as a unit by a fluid pressure-operated servo. When they are applied, torque is distributed through the clutch disc assembly 60 from the turbine shaft 42 to both the compound carrier 36 and to the sun gear 26.

Overrunning coupling 70 distributes a portion of the torque delivered through the friction discs of the direct clutch to the carrier. Overrunning coupling 72 accommodates the transfer of torque from the friction discs to sleeve shaft 74, which serves as a torque input shaft for the sun gear 26 when the forward clutch 40 is applied.

Figure 2:
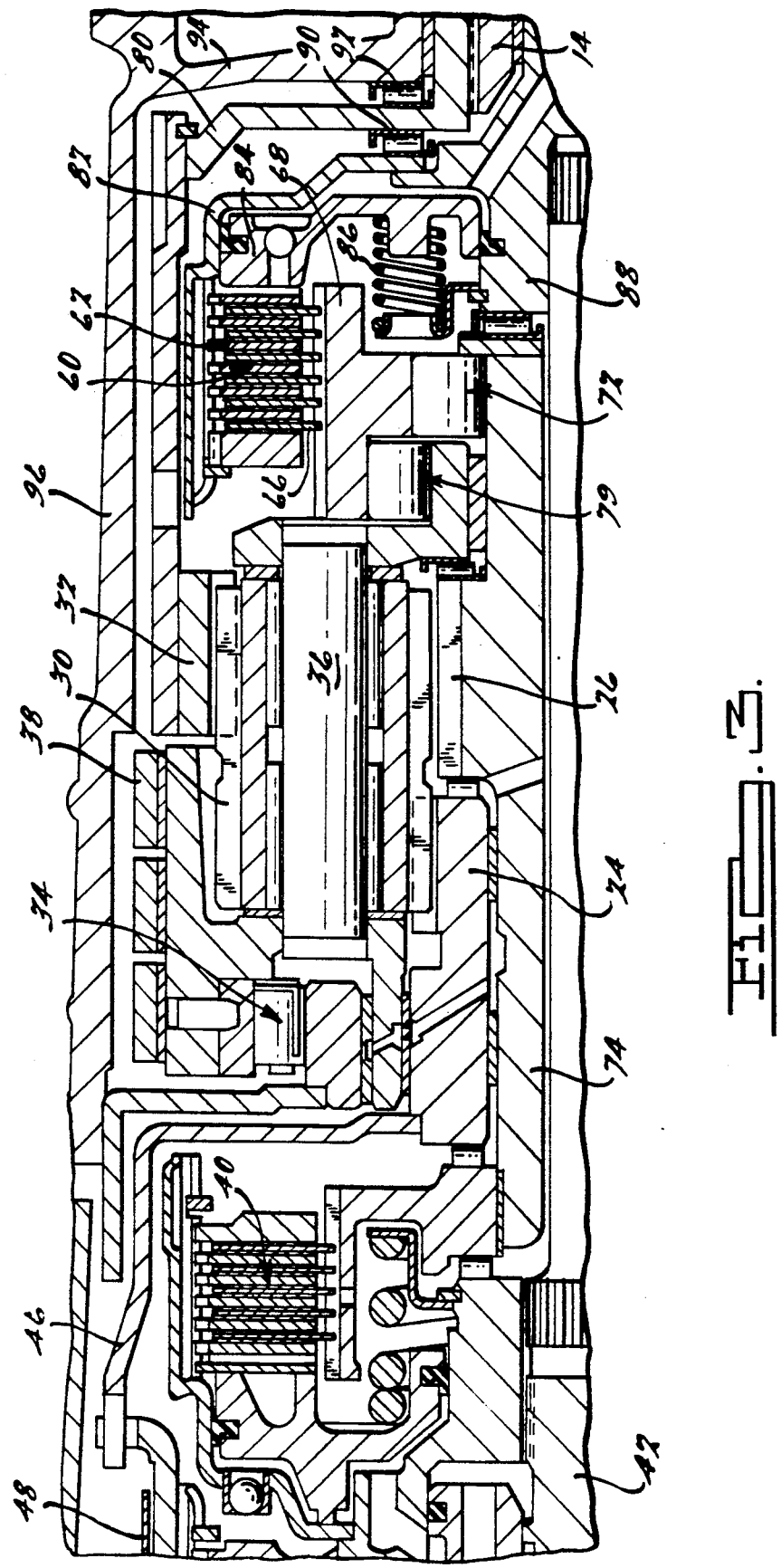
FIG. 2 is a table that shows the sequence necessary for the engagement and the release of clutch and brake members for controlling the gear elements of the transmission illustrated schematically in FIG. 1.

The sequence of the operation of the clutches and brakes of the transmission schematically illustrated in FIG. 1 is apparent from the chart of FIG. 2. In FIG. 2, the symbols B1 and B2 identify the brakes shown in part at 48 and 38, respectively. Symbols C1 through C8 identify, respectively, the clutches and brakes shown at 40, 50, 60, 34, 54, 58, 70 and 72, respectively. Symbols "X" are used on the left-hand side of the chart of FIG. 2 to indicate the brakes and clutches that are engaged during forward drive operation. During engine braking or coast operation, the same symbols "X" are used to designate the clutches and brakes that are engaged during coast operation. In both the drive and coast charts of FIG. 2, the symbols "OR" indicate the overrunning condition of the respective overrunning clutches.

As seen in FIG. 3, output shaft 14 is splined at 52 to torque transfer member 80, which connects the ring gear 32 to the output shaft. Located radially inward of the member 80 is cylinder member 82 for the clutch 60. Cylinder member 82 defines an annular cylinder within which is positioned an annular piston 84. Piston return spring 86 anchored against a spring reaction element carried by the hub 88 of the cylinder member 82 normally tends to release the direct drive clutch.

The direct drive clutch 60 may include 6 discs as indicated in the preferred embodiment of FIG. 3. I contemplate, however, that as few as five or perhaps four, friction discs might be sufficient to provide the necessary torque capacity of the clutch in a nonsynchronous shift for an automotive vehicle driveline having an engine of the kind commercially used in the automotive vehicle industry.

Radial needle thrust bearings 90 and 92 are situated on either side of the cylinder member 80 whereby thrust forces can be distributed directly to a transmission bearing support wall 94 that forms a part of the transmission housing shown generally at 96.

Direct clutch 60 is applied to effect a ratio change from the second ratio to the third ratio. Torque then is delivered from the turbine shaft 42, through the engaged forward clutch 40 and through the direct clutch 60 simultaneously. Under these conditions, overrunning couplings 70 and 72 are engaged simultaneously so that torque is distributed through them, respectively, to the carrier 39 and to the sun gear 26.

A nonsynchronous ratio shift from the third ratio to the fourth overdrive ratio is achieved as the brake band 48 becomes applied. Clutch 72 free-wheels under these conditions, but torque is transferred through clutch 70 to the carrier. The ratio change is nonsynchronous and only a single friction element; namely, the brake band 48, need be actuated to effect the ratio change. As indicated in the coast portion of the chart of FIG. 2, both overrunning couplings 70 and 72 free-wheel during operation in the overdrive range as the engine braking mode is established.

It is apparent from the foregoing description that the relative angular velocity of the friction discs 66 with respect to the friction disc 62 is the same regardless of whether the transmission is operating in the direct drive range or in the overdrive range. That is because of the common clutch member 68 for all of the friction discs. The member 68 also serves as an outer race for each of the two overrunning couplings 70 and 72. The calibration of the clutch 60 for maximum smoothness during ratio changes between third and fourth ratios thus is simplified and is more reliable than the calibration of the direct clutch of the reference '156 patent. Further, the full torque transmitting output of all of the clutch discs is available during operation in each of the two highest ratios. This makes it possible to reduce the number of discs for any given torque capacity.

Having described a preferred embodiment of my invention, what I claim and desire to secure by U.S. Letters Patent is:

1. A planetary power transmission mechanism comprising:
   a compound planetary gear unit having a large sun gear, a small sun gear and a ring gear, a compound carrier having a first set of pinions engaging said ring gear and said large sun gear, a second set of pinions engaging said small sun gear, said first and second sets of pinions engaging each other;

a torque input shaft and a torque output shaft; and forward clutch means for connecting said input shaft and said small sun gear, reverse clutch means for connecting said input shaft and said large sun gear and direct clutch means for connecting said input shaft to said carrier;

said direct clutch means comprising a pair of overrunning clutches with a common clutch race, one of said overrunning clutches including a race connected to said carrier and the other of said overrunning clutches including a race connected to said small sun gear and friction clutch elements connected to said common clutch race and to said input shaft whereby speed ratio changes between an overdrive ratio and a direct drive ratio are obtained in a nonsynchronous fashion with a high degree of smoothness.

2. The combination as set forth in claim 1 wherein said pair of overrunning clutches are in parallel disposition, one with respect to the other, and friction discs in a disc assembly disposed between said input shaft and said common race, each overrunning clutch being in series disposition with respect to said disc assembly.

3. The combination as set forth in claim 2 wherein said forward clutch means and said reverse clutch means are located on one axial side of said gear unit and said direct clutch means is located on the opposite axial side of said gear unit.

4. A power transmission for delivering torque from a vehicle engine torque input member to a driven member, comprising:

a compound planetary gear unit with a torque output gear element, two torque input gear elements and a reaction element;

forward drive clutch means for connecting said input member to one of said torque input gear elements and a reverse clutch means for connecting the other of said torque input gear elements to said input member;

direct clutch means for connecting said input member to two of said elements of said gear unit, said direct clutch means defining separate torque flow paths between said input member and said two of said gear unit elements; and a separate overrunning coupling being disposed in and partly defining each of said torque flow paths.

5. The combination as set forth in claim 4 wherein said overrunning couplings are in parallel disposition, one with respect to the other;

said direct clutch means comprising friction discs in a disc assembly disposed between said input member and said overrunning couplings, said overrunning couplings having a common race, friction discs of said disc assembly being connected to said common race.

6. The combination as set forth in claim 5 wherein said forward drive clutch means and said reverse clutch means are located on one axial side of said gear unit and said direct clutch means is located on the opposite axial side of said gear unit.

* * * * *